United States Patent [19]

Schwarzenberg et al.

[11] Patent Number: 4,493,724
[45] Date of Patent: Jan. 15, 1985

[54] APPARATUS FOR BENDING GLASS SHEETS

[75] Inventors: Norbert Schwarzenberg; Heinz Ueberwolf; Friedrich Halberschmidt, all of Herzogenrath; Joseph Audi, Aachen, all of Fed. Rep. of Germany

[73] Assignee: Saint-Gobain Vitrage, Aubervilliers, France

[21] Appl. No.: 537,593

[22] Filed: Sep. 30, 1983

[30] Foreign Application Priority Data

Oct. 11, 1982 [FR] France .............................. 82 16970

[51] Int. Cl.³ .............................................. C03B 13/16
[52] U.S. Cl. ........................................ 65/273; 65/245; 65/253; 65/286; 29/116 R; 29/127
[58] Field of Search ................ 65/245, 253, 273, 286; 29/116 R, 127

[56] References Cited

U.S. PATENT DOCUMENTS

| 2,960,749 | 11/1960 | Robertson et al. | 29/116 R |
|---|---|---|---|
| 3,563,721 | 2/1971 | Ritter, Jr. | |
| 3,831,239 | 8/1974 | Hoff et al. | 29/125 |
| 3,934,996 | 1/1976 | Frank | 65/106 |
| 4,203,754 | 5/1980 | Potier | 65/273 |
| 4,226,608 | 10/1980 | McKelvey | 65/106 |

FOREIGN PATENT DOCUMENTS

| 1448278 | 6/1966 | France | 65/245 |
|---|---|---|---|
| 1134775 | 11/1968 | United Kingdom . | |

*Primary Examiner*—Arthur Kellogg
*Attorney, Agent, or Firm*—Pennie & Edmonds

[57] ABSTRACT

A roller construction is described for use in glass bending apparatus employing an array of curved rods. A tubular sheath is rotatably mounted on a curved rod. The sheath comprises a tubular metal winding that is coaxial with the rod and a coaxial metal meshing adjacent either the inner or outer surface of the winding. Such a sheath provides both good torsional resistance and flexibility in the axial direction. When an array of such curved rods is used to define a cylindrical surface in glass bending apparatus, heated glass sheets may be bent on such array to conform their curvature to the surface defined by the rods.

7 Claims, 4 Drawing Figures

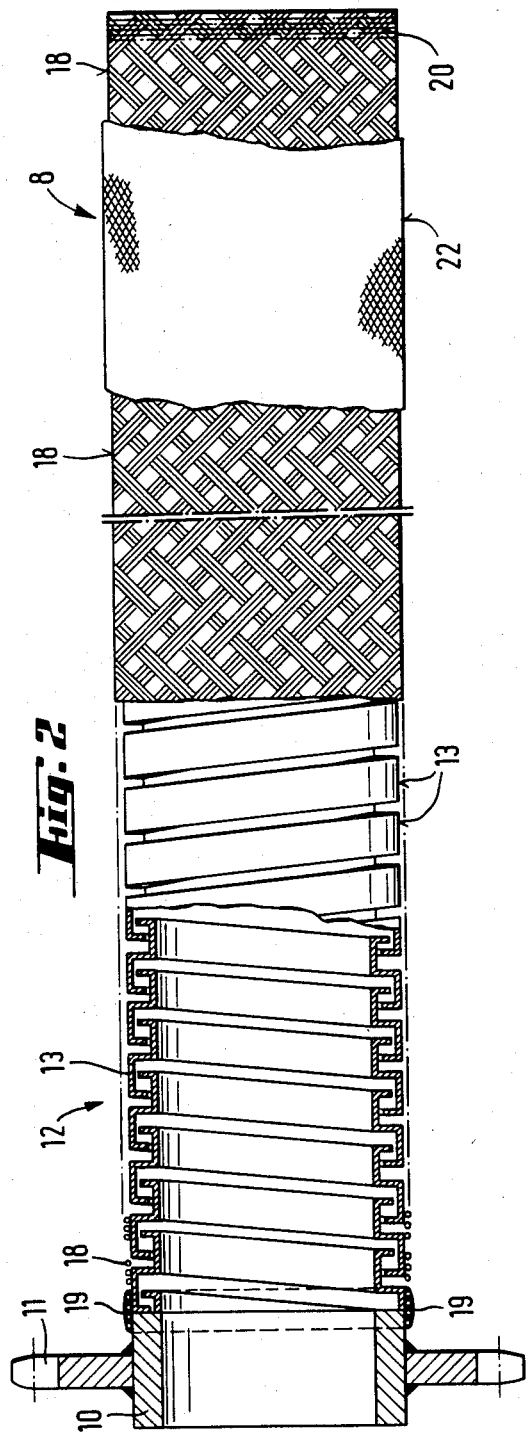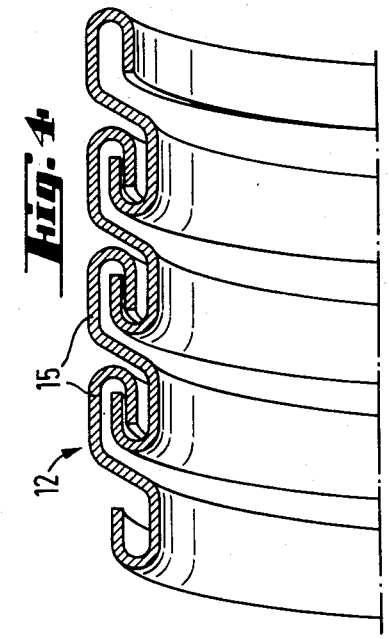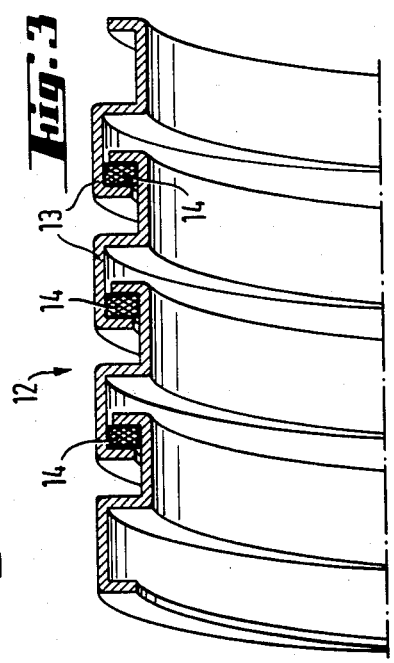

APPARATUS FOR BENDING GLASS SHEETS

BACKGROUND OF THE INVENTION

The present invention relates to apparatus for bending or shaping glass in sheet form while heated to a plastic state.

Apparatus is described in U.S. Pat. Nos. 3,831,239 and 4,203,754 and British Pat. No. 1,134,775, which are incorporated herein by reference, for continuously bending heated glass sheets in a horizontal position. As described in such patents, such apparatus includes a succession of arched rods, each of which is mounted on a curved rod and is covered with a tubular casing in the form of a thin layer of material. The rods are mounted so that each rod is rotatable about an axis passing through the ends of that rod; and a mechanical linkage couples the rods together so that they may all be rotated simultaneously. Such rotation may extend from a first position in which the plane defined by the curvature of each rod lies in a surface defined by the ends of all the rods to a second position in which the plane of each rod is perpendicular to the surface defined by the ends of the rods. With the rods in this second position, and in any other position between the first and second position, the rods define a transversely curved surface or envelope.

A roller is rotatably mounted on each rod and connected to a suitable drive mechanism so that the rollers move heated glass sheets across them. To permit the roller to rotate about the arched rod, the roller is relatively flexible in the axial direction. Since the angular position of the rollers defines a transverse contour, the heated glass sheets sag under their own weight as they are moved over the rollers and conform themselves to the contour defined by the rods. As described in U.S. Pat. No. 4,203,754, the relative height of the rollers may also vary so as to impart a longitudinal curvature to the glass sheets.

To withstand the glass bending temperature, which ranges from at least 600°–700° C., the rollers must be made of refractory material. In addition, because the rods are curved, the rollers are subjected to considerable mechanical stress as they rotate about the rod. Each segment of their length is alternately being compressed and stretched in a single rotation about the curved portion of the rod. To accommodate such stress, the rollers must have relatively high flexibility in the axial direction. At the same time, to avoid distorting the glass sheet as it is moved across the casing, the rollers must have good torsional resistance. Because of the stress imposed on the rollers, they tend to deteriorate relatively quickly and have to be replaced fairly often at significant expense for labor and materials and equipment downtime.

It is known in the art to make wound metal tubes which consist, for example, of a metal strip with an S section bent in a spiral whose neighboring coils fit into one another. The loose fit of the coils allows the fit sufficient play in the axial direction so as not to create harmful traction or compression stresses if such a tube is used as the roller on an arched rod in glass bending apparatus. However, these tubes do not have sufficient torsional strength for use in this application. Depending on the direction of the tube spiral and the friction that opposes rotation of the tube, the spiral can be caused to increase in diameter or to contract. In the latter case, the spiral will tighten on the rod and perhaps lock thereon. In either case, the wound metal tube can be damaged and, in some circumstances, destroyed.

BRIEF SUMMARY OF THE INVENTION

In the present invention, we have devised a roller that provides both axial flexibility and sufficient torsional strength and accordingly has a much longer service life. In accordance with our invention, the roller comprises a tubular metal winding and a flexible tubular sheath of metal meshing which is contiguous to a surface of the tubular metal winding. Both the tubular metal winding and the flexible sheath of metal meshing lie coaxially with the rod and are affixed at their ends to each other to maintain said members in rotary position about said rod.

The tubular metal winding is formed by winding a narrow sheet of metal spirally about the axis of the rod. The width of the metal is variable but the length is sufficient to permit a spiral winding about the entire length of the rod. Advantageously, a transverse section of the metal is shaped like an "S" so that when spirally wound, the adjacent turns of metal about the rod interlock either by simple overlap, by folded seams or by some other interlocking means. This interlocking scheme makes the tubular metal winding flexible to axial strains and stresses because each interlocking pair of metal turns has significant axial tolerance within the confines of its interlocking coupling.

The flexible sheath is a metal mesh which lies coaxially to the rod, contiguous to the tubular metal winding, and advantageously is oriented so that the wire strands of said meshing are wound in opposite directions at approximately a forty-five degree angle to the axis of the rod. The metal meshing can be contiguous either to the inner or the outer surface of the tubular metal winding. We have found that such use of metal meshing with a spirally wound metal tube provides a roller that has good axial flexibility and relatively high torsional rigidity and, as a result, has an improved service life.

BRIEF DESCRIPTION OF THE DRAWINGS

These and other objects, features, and advantages of the invention will be more readily apparent from the following description of a preferred embodiment of the invention in which:

FIG. 2 is a fragmentary view, partly in axial section, of the roller of FIG. 1;

FIG. 3 is an enlarged fragmentary and cross-sectional view of a portion of the embodiment shown in FIG. 1; and FIG. 4 is the same view of the axial section of the tubular metal winding as FIG. 3 but detailing a different embodiment of the invention.

DESCRIPTION OF THE PREFERRED EMBODIMENT

Figure 1:
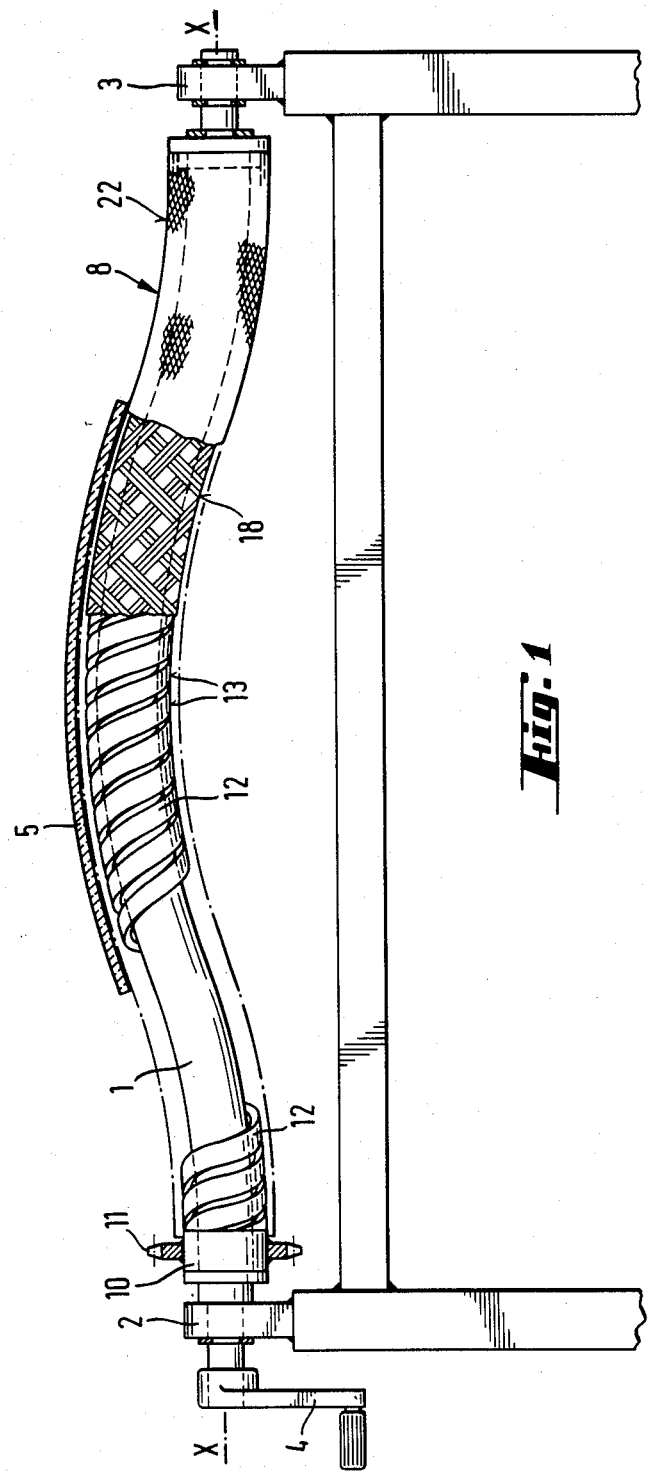
FIG. 1 is a view on elevation of a glass bending roller according to the invention.

Referring to FIG. 1, the roller of the invention has at its core a rod 1 having parallel collinear end portions and a curved or arched central portion. The ends of the rod are supported in bearings 2 and 3 for rotation about an axis X—X by means of a crank 4 affixed to the rod. In the position shown, rod 1 is arranged vertically and the plane of its arch coincides with that of the drawing. If the rod is made to pivot ninety degrees in relation to this position, its curve will lie flat and it will offer a flat upper bearing surface.

As described in U.S. Pat. No. 4,203,754, a complete glass bending apparatus includes an array of rollers. With reference to FIG. 1, the other rollers of the plurality are located above and below the plane of the figure. By rotating crank 4, the plane in which the rod is curved can be shifted between the position of FIG. 1 and the position in which the plane is perpendicular to the plane of the figure. By appropriate adjustment of the angle of each of the rods, the array of rods can impose on a glass sheet 5 any degree of curvature between zero when the rods 1 are rotated ninety degrees from the position of the rod 1 in FIG. 1 and the maximum that is obtainable with the rollers oriented as in FIG. 1. Advantageously, the successive shafts are inclined upward at an angle that increases in the direction of conveyance of the glass sheets so that the curvature of the sheet of glass continually increases.

A tubular member or roller 8 is engaged over rod 1 and desirably extends over the entire curved portion of the rod or at least over as much of the length of the curved portion as can be engaged by the width of the glass sheet 5 to be bent. Roller 8 is mounted for rotation on rod 1 and for this purpose one end of roller 8 is attached to a ferrule 10 that is affixed to a pinion 11. Pinion 11, in turn, is journaled on a straight portion of the rod 1 and is arranged to be driven in rotation by a transmission chain (not shown).

Referring now to FIG. 2, tubular member 8 comprises a tubular metal winding 12, a flexible sheet of metal meshing 18, and a casing 22. Winding 12 is formed by winding a narrow sheet 13 of metal spirally about the axis of the rod 1. The width of the metal is variable and shaped like an "S" so that when spirally wound, the adjacent turns of metal about the rod 1 interlock as shown in FIGS. 3 and 4 discussed below. Advantageously, the sheet of metal is a thin refractory steel sheet such as a chromium-nickel steel. The tubular metal winding 12 is attached at one end to ferrule 10.

The flexible sheet of metal meshing 18 lies contiguous to and disposed about rod 1 on either the inner or outer surfaces of the tubular metal winding 12. The meshing 18 is made of thin refractory steel wires which are wound in opposite directions at an angle to the axis of the rod. Preferably, such wires are oriented at a forty-five degree angle to the rod.

One end of the flexible sheath of metal meshing 18 is welded together with tubular metal winding 12 to ferrule 10 by welding bead 19 while the other end is welded by welding bead 20 to the other end of the tubular metal winding 12. As a result, tubular winding 12 and metal meshing 18 rotate together about rod 1 in response to drive forces imposed on pinion 11.

Casing 22 is a tubular sleeve that fits over metal winding 12 and sheath 18. The casing typically is made of a fabric or knit of glass fibers or similar refractory fibrous material.

Referring now to FIGS. 3 and 4; the interlocking of ad3acent turns of the tubular metal winding 12 can take on several forms. In the preferred embodiment shown in FIG. 3, the width of the metal 13 used in the tubular metal winding 12 is shaped like an "S" so that when the metal is spirally wound, the adjacent turns of metal about rod 1 interlock. A packing 14 of refractory elastic material such as a cord of glass fibers or asbestos fabric can be inserted between the interlocking joints of the "S" shaped metal winding 12. In another embodiment shown in FIG. 4, a metal winding 12' is formed by shaping a metal strip 15 like an "S", spirally winding the strip, and then folding one edge of the strip so that the adjacent turns of metal interlock with a folded "S" seam.

While the invention has been described in conjunction with specific embodiments, it is evident that numerous alternatives, modifications, and variations will be apparent to those skilled in the art in light of the foregoing description.

We claim:

1. In apparatus for bending glass, a roller rotatably mounted on a curved portion of a rod, said roller member comprising a tubular metal winding and a flexible sheath of metal meshing both coaxial to the rod and affixed at their ends to each other so that said tubular metal winding and flexible sheath can be rotated together about said rod.

2. A roller according to claim 1 wherein the flexible sheath of metal meshing is contiguous to and disposed about an outer surface of the tubular metal winding.

3. A roller according to claim 1 wherein the flexible sheath of metal meshing is contiguous to and disposed about an inner surface of the tubular metal winding.

4. A roller according to claim 1 wherein the tubular metal winding and the flexible sheath of metal meshing are both made of refractory material.

5. A roller according to claim 1 wherein the tubular metal winding is an S-shaped strip of metal that is wound in a spiral about said rod with adjacent edges of the spiral being interlocked.

6. A roller according to claim 1 wherein the flexible sheath of metal meshing is made of wire strands wound in opposite directions and oriented at an angle to the axis of the rod.

7. A roller according to claim 1 wherein the flexible sheath of metal meshing is made of wire strands wound in opposite directions and are oriented at approximately a forty-five degree angle to the axis of the rod.

* * * * *